(12) United States Patent
Kraitzer et al.

(10) Patent No.: US 11,078,094 B2
(45) Date of Patent: *Aug. 3, 2021

(54) PROCESS, DEVICE AND SYSTEM FOR TREATMENT OF WATER

(71) Applicant: MEKOROT WATER COMPANY, LTD, Tel-Aviv (IL)

(72) Inventors: Tomer Kraitzer, Herzliya (IL); Roy Elkayam, Hazor Haglilit (IL)

(73) Assignee: MEKOROT WATER COMPANY LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,571

(22) Filed: Sep. 19, 2019

(65) Prior Publication Data
US 2020/0039844 A1 Feb. 6, 2020

Related U.S. Application Data

(63) Continuation of application No. 15/105,038, filed as application No. PCT/IL2014/051110 on Dec. 18, 2014, now Pat. No. 10,421,671.

(30) Foreign Application Priority Data

Dec. 19, 2013 (IL) .......................................... 230024

(51) Int. Cl.
*C02F 1/28* (2006.01)
*C02F 1/72* (2006.01)
(Continued)

(52) U.S. Cl.
CPC ............... *C02F 1/288* (2013.01); *B01J 20/08* (2013.01); *B01J 20/28016* (2013.01);
(Continued)

(58) Field of Classification Search
CPC .. C02F 1/288; C02F 1/74; C02F 1/281; C02F 1/727; C02F 2101/006; C02F 2101/105;
(Continued)

(56) References Cited

U.S. PATENT DOCUMENTS 3,167,506 A 1/1965 Fackler et al.
4,320,004 A 3/1982 Schecter
(Continued)

FOREIGN PATENT DOCUMENTS

AU 2011369593 B2 9/2014
CA 2374861 A1 6/2003
(Continued)

OTHER PUBLICATIONS

Chakrabarti et al., "Active manganese oxide: a novel adsorbent for treatment of wastewater containing azo dye," Water Science & Technology, vol. 60, Iss. 12, 2009, 3017-3024. (Year: 2009).*
(Continued)

*Primary Examiner* — Anthony J Zimmer
(74) *Attorney, Agent, or Firm* — Naomi Rosenman-Helfand

(57) ABSTRACT

The present disclosure provides a particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter. Also provided herein is a process for removing chemical contaminants from flowing water making use of the particulate matter and a device and a system comprising the particulate matter.

12 Claims, 10 Drawing Sheets

(51) Int. Cl.
| | |
|---|---|
| *C02F 1/74* | (2006.01) |
| *B01J 20/08* | (2006.01) |
| *B01J 20/28* | (2006.01) |
| *C02F 101/10* | (2006.01) |
| *C02F 101/20* | (2006.01) |
| *C02F 101/22* | (2006.01) |
| *C02F 103/00* | (2006.01) |
| *C02F 103/06* | (2006.01) |
| *C02F 103/08* | (2006.01) |
| *C02F 103/10* | (2006.01) |
| *C02F 101/00* | (2006.01) |

(52) U.S. Cl.
CPC .............. *C02F 1/281* (2013.01); *C02F 1/727* (2013.01); *C02F 1/74* (2013.01); *C02F 2101/006* (2013.01); *C02F 2101/10* (2013.01); *C02F 2101/103* (2013.01); *C02F 2101/105* (2013.01); *C02F 2101/106* (2013.01); *C02F 2101/20* (2013.01); *C02F 2101/203* (2013.01); *C02F 2101/206* (2013.01); *C02F 2101/22* (2013.01); *C02F 2103/007* (2013.01); *C02F 2103/06* (2013.01); *C02F 2103/08* (2013.01); *C02F 2103/10* (2013.01); *C02F 2303/16* (2013.01)

(58) Field of Classification Search
CPC .............. C02F 2101/20; C02F 2103/08; C02F 2103/10; C02F 2101/22; C02F 2101/206; C02F 2101/203; C02F 2103/06; C02F 2101/106; C02F 2101/103; C02F 2101/10; C02F 2303/16; C02F 2103/007; B01J 20/28016; B01J 20/08
See application file for complete search history.

(56) References Cited

U.S. PATENT DOCUMENTS

| | | | |
|---|---|---|---|
| 5,705,078 | A | 1/1998 | Kurek et al. |
| 6,790,363 | B2 | 9/2004 | Vempati |
| 2003/0196960 | A1 | 10/2003 | Hughes |
| 2006/0030476 | A1 | 2/2006 | Lovell et al. |
| 2006/0032807 | A1 | 2/2006 | Sansalone |
| 2007/0086935 | A1 | 4/2007 | Chen et al. |
| 2013/0240439 | A1 | 9/2013 | Pradeep et al. |
| 2013/0319926 | A1 | 12/2013 | Sansalone |

FOREIGN PATENT DOCUMENTS

| | | |
|---|---|---|
| GB | 1361827 A | 7/1974 |
| JP | 2004130268 A | 4/2004 |
| WO | 9816476 A1 | 4/1998 |
| WO | 0240149 A2 | 5/2002 |
| WO | 2004099089 A1 | 11/2004 |
| WO | 2007052085 A1 | 5/2007 |
| WO | 2012168957 A1 | 12/2012 |

OTHER PUBLICATIONS

Lauren Zuravnsky, "Development of Soluble Manganese Sorptive Contactors for Enhancing Potable Water Treatment Practices", Thesis, Sep. 11, 2006, submitted to the faculty of the Virginia Polytechnic Institute and State University.

Félix Echeverría, Juan G. Castaño, Carlos Arroyave, Gustavo Peñuela, Auxilio Ramírez, Jordi Morató., Characterization of deposits formed in a water distribution system, Ingeniare. Revista chilena de ingeniería, vol. 17, 2009, pp. 275-281.

Safety Data Sheet, Mar. 13, 2015, Tampa, Florida U.S.A http://www.clackcorp.com/downloads/msds/Active%20Online%20Filter%20Medias/8006_A8006SS_A8006SS-35_BIRM.pdf.

Clack Birm® is a granular filter media commonly used for the reduction of iron and/or manganese from water supplies, brochure, Apr. 21, 2016, Form No. 2350, Wisconsin, U.S.A http://www.clackcorp.com/downloads/ion_exchange_resin_and_filter_media/birm_2350.pdf.

Carlson et al., "Iron and Manganese Oxides in Finnish Ground Water Treatment Plants" Water Research vol. 21, No. 2, pp. 165-170, 1987.

Gounot, Ann-Monique, "Microbial oxidation and reduction of manganese: Consequences in groundwater and applications" FEMS Microbiology Reviews 14 (1994) 339-350.

William Knocke, Lauren Zuravnsky, John Little, John Tobiason. "Adsorptive contactors for removal of soluble manganese during drinking water treatment" Journal—American Water Works Association (2010).

* cited by examiner

PROCESS, DEVICE AND SYSTEM FOR TREATMENT OF WATER

RELATED APPLICATIONS

This application is a continuation of U.S. Ser. No. 15/105,038 filed Jun. 16, 2016 which is a National Phase of PCT Patent Application No. PCT/IL2014/051110 having International filing date of Dec. 18, 2014, which claims the benefit of priority of Israel Application No. 230024 filed Jun. 19, 2013. The contents of the above applications are all incorporated by reference as if fully set forth herein in their entirety.

TECHNOLOGICAL FIELD

The present disclosure relates to processes, devices and systems for treating water and specifically for removing chemical contaminants from flowing water.

PRIOR ART

References considered to be relevant as background to the presently disclosed subject matter are listed below:
Acknowledgement of the above references herein is not to be inferred as meaning that these are in any way relevant to the patentability of the presently disclosed subject matter.
  Thesis on "Development of Soluble Manganese Sorptive Contactors for Enhancing Potable Water Treatment Practices" by Lauren Zuravnsky, submitted to the faculty of the Virginia Polytechnic Institute and State University.
  AU2011369593
  Felix Echeverria, Juan G. Castaño, Carlos Arroyave, Gustavo Peñuela, Auxilio Ramírez, Jordi Morató, Characterization of deposits formed in a water distribution system, Ingeniare. Revista chilena de ingeniería, vol. 17, 2009, pp. 275-281.
  WO2007052085
  WO9816476
  US2003196960
  http://www.clackcorp.com/downloads/msds/Active%20Online%20Filter%20Medias/A8006_A8006SS_A8006SS-35_BIRM.pdf
  http://www.clackcorp.com/downloads/ion_exchange_resin_and_filter_medi/birm_2350.pdf

BACKGROUND

Oxidation methods may be used to remove chemical contaminants from water by oxidation of the soluble contaminants into a solid form. The oxidized solid particles may then be removed for example by coagulation, flocculation, clarification, or filtration. The oxidized material often forms particles in the colloidal range which are not efficiently removed when applied directly to filtration media.

In one research, the development of soluble manganese sorptive contactors for enhancing potable water treatment practices has been described [Lauren Zuravnsky in her Thesis submitted to the faculty of the Virginia Polytechnic Institute and State University in partial fulfillment of the requirements for the degree of Master of Science In Environmental Engineering]. As discussed in this Thesis, soluble manganese in water can reach and exceed the Secondary Maximum Contaminant Level (SMCL) of 0.05 mg/L in the water distribution system which, at this level, can be oxidized to solid Mn-oxide particulates, leading to water discoloration events. The research showed that pyrolucite media applied to water up was effective in removing soluble manganese to a level of 80-90% out of initial manganese concentration. Other media were also examined.

AU2011369593 relates to a magnetite-birnessite mixture, to a synthesis method therefor, and to a water-treatment method using same.

Félix Echeverría, et al describes the presence of deposits materials collected across the water distribution system of a tropical including a brown coloured deposit, tubercles and white deposits with aluminosilicates and humic acids found to be main constituents in brown deposits and tubercles with mostly mixtures of magnetite, goethite and in some cases lepidocrocite. The white deposits were formed by calcite, aluminosilicates and quartz.

WO2007052085 describes method for treating underground waters for removing arsenic.

WO9816476 describes a process for the removal of dissolved metals and/or metalloids from an aqueous medium containing same.

US2003196960 describes a method and device for filtration and/or purification of fluids water or other solutions containing microbiological and chemical contaminants.

Filter media known by the commercial name BIRM® and used for reducing iron and/or manganese from water was described in http://www.clackcorp.com/downloads/msds/Active%20Online%20Filter%20Medias/A8006_A8006SS_A8006SS-35_BIRM.pdf and in http://www.clackcorp.com/downloads/ion_exchange_resin_and_filter_media/birm_2350.pdf.

GENERAL DESCRIPTION

The present invention is based on the finding of a unique composite material that was effective in removing a variety of chemical contaminants from flowing water.

Based on the finding disclosed herein, the present invention provides, in accordance with a first aspect, a particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter.

The present disclosure provides, in accordance with a second aspect, a process for removing chemical contaminants from flowing water, the process comprises:
  mixing oxygen containing fluid with the flowing water under conditions that allow dissolution of the oxygen in the flowing water to thereby obtain oxygen-rich flowing water;
  passing the oxygen-rich flowing water through a volume of particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter, said passing is for a time sufficient to allow oxidation of at least one chemical contaminant to obtain flowing water with a level of the at least one contaminant below a pre-determined threshold.

In accordance with a third aspect, the present disclosure provides a device comprising:
  a mixing compartment comprising a first inlet for introducing thereto flowing water and a second inlet for introducing thereto oxygen containing fluid to allow dissolution of oxygen in said flowing water;

a treatment compartment downstream and in fluid communication with said mixing compartment, the mixing compartment being configured to pass therethrough oxygen rich flowing water received from the mixing compartment, the treatment compartment comprising particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter; and an outlet downstream to the treatment compartment to allow discharge of water received from said treatment compartment.

In accordance with a fourth aspect, the present disclosure provides a system comprising:

(i) a device comprising:
  a mixing compartment comprising a first inlet for introducing thereto flowing water and a second inlet for introducing thereto oxygen containing fluid to allow dissolution of oxygen in said flowing water;
  a treatment compartment downstream and in fluid communication with said mixing compartment, the mixing compartment being configured to pass therethrough oxygen rich flowing water received from the mixing compartment, the treatment compartment comprising particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter; and
  an outlet downstream to the treatment compartment to allow discharge of water received from said treatment compartment.

(ii) a reservoir of oxygen containing fluid being in fluid communication with said first inlet;

(iii) a control unit for controlling at least one of
  flow of oxygen into the mixing compartment;
  level of oxygen in said flowing water;
  flow of oxygen rich flowing water through the treatment zone.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
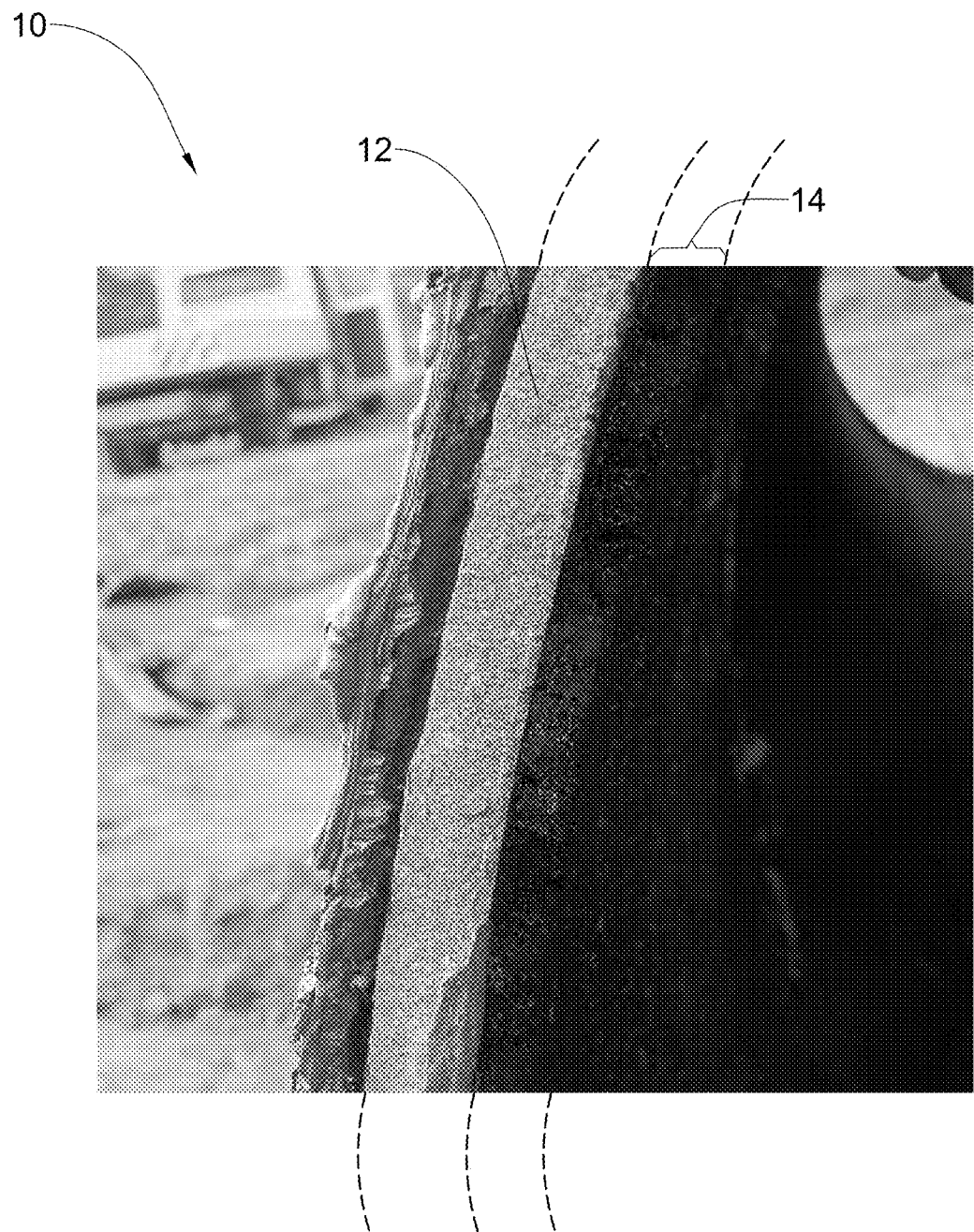
FIG. 1 is an image showing representative cross section of a pipe on which matter was deposited on the lumen of the pipe and from which the particulate matter according to some embodiments of the invention may be obtained.

It is well recognized that water requires treatment before reaching the consumers. To this end, various water treatment technologies have been developed and are still under development for purpose of removing various contaminants and improving the water quality.

Among others, water contains undesired metals and other chemical contaminants. It is an aim of the present disclosure to provide a process, device and system facilitating removal of such undesired chemical contaminants.

Specifically, the present disclosure provides a particulate matter comprising a combination of crystalline manganese oxide and amorphous manganese oxide and a process for removal of non-biological contaminants from flowing water using the particulate matter. Further specifically, the inventors have found that the particulate matter as defined herein has a unique structural morphology that provides the matter with a high specific surface area (active surface) and an unexpectedly high mass loading on the particulate matter of the contaminants to be removed during the water treatment.

As further detailed below, the unique morphology of the particulate matter provides the matter with a high overall porosity, to allow the utilization of more internal pore volume for the chemical treatment of the contaminants in the water flowing within these porous internal passages. Without being bound by theory, it was suggested by the inventors that these passages along with the outer surface of particles forming the particulate matter can absorb soluble contamination from flowing water. It has been found that the absorbed contaminants are oxidized to form non-soluble forms of the contaminants. In some embodiments, and without being bound by theory, it is assumed that the oxidized contaminants are entrapped by at least the crystalline manganese oxide.

The disclosure described herein may be used for a large spectrum of contaminants, with preference to chemical substances, as shown in Examples 2 and 3. In accordance with the present disclosure, the contaminants undergo oxidation and as such may be referred to as "oxidizable chemical contaminants".

The particulate matter may be artificially formed, and in some embodiments, the particulate matter is derived from sediments within water pipes as further discussed below. It was unexpectedly found by the inventors that the particulate matter is self-regenerated when even a seed amount of the particulate matter is brought into contact with manganese containing water in the presence of an oxidizing agent, such as an oxygen source. In other words, continuous flow over such matter of water containing at least manganese and being rich with oxygen lead to rebuild of new matter over existing matter. The accumulated mass containing at least manganese oxide in crystal form and in amorphous form (as defined herein) may be used as a substrate for further treating water (providing new adsorption and oxidation sites) or it may be scrapped off and collected for future use.

Thus, in accordance with a first of its aspects the present disclosure provides a particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter.

In accordance with some other aspects, the present disclosure provides a process for removing contaminants from flowing water, the process comprising:

mixing oxygen containing fluid with the flowing water under conditions that allow dissolution of the oxygen in the flowing water to thereby obtain oxygen-rich flowing water;

passing the oxygen-rich flowing water through a volume of particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter, said passing is for a time sufficient to allow oxidation of at least one chemical contaminant to obtain flowing water with a level of the at least one contaminant below a pre-determined threshold.

The present disclosure also provides, in accordance with a third of its aspects, a device comprising:

a mixing compartment comprising a first inlet for introducing thereto flowing water and a second inlet for introducing thereto oxygen containing fluid to allow dissolution of oxygen in said flowing water;

a treatment compartment downstream and in fluid communication with said mixing compartment, the mixing compartment being configured to pass therethrough oxygen rich flowing water received from the mixing compartment, the treatment compartment comprising particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter; and an outlet downstream to the treatment compartment to allow discharge of water received from said treatment compartment.

Finally, the present disclosure provides, in accordance with a third of its aspects, a system comprising:

(i) a device comprising:
  a mixing compartment comprising a first inlet for introducing thereto flowing water and a second inlet for introducing thereto oxygen containing fluid to allow dissolution of oxygen in said flowing water;
  a treatment compartment downstream and in fluid communication with said mixing compartment, the mixing compartment being configured to pass therethrough oxygen rich flowing water received from the mixing compartment, the treatment compartment comprising particulate matter comprising a combination of crystalline manganese oxide and amorphous manganese oxide, the crystalline form being present and forms passages throughout a cross section of said particulate matter, wherein said crystalline form define a specific surface area that is greater than the outer surface of said particulate matter; and
  an outlet downstream to the treatment compartment to allow discharge of water received from said treatment compartment.

(ii) a reservoir of oxygen containing fluid being in fluid communication with said first inlet;
(iii) a control unit for controlling at least one of
  flow of oxygen into the mixing compartment;
  level of oxygen in said flowing water;
  flow of oxygen rich flowing water through the treatment zone.

The technology disclosed herein is based on the identification by the inventors of black deposits on the interior wall of water pipes. FIG. 1 is a photographic image providing a cross section view of a water pipe 10 including the wall 12 and a thick black deposit 14 on the inner surface of wall 12. Surprisingly, the inventors have found that in the presence of such black deposit, the level of contaminants in the water with which it is brought into contact is lower than expected.

The inventors have thus envisaged that the black deposit may have a benefit in removing chemical contaminants from water, similar to the removal of manganese. To this end, the inventors have prepared from the black deposit particulate matter and analyzed the same to determine that it comprises at least manganese oxide in two morphological forms, a crystalline form and an amorphous form. The particulate matter was then used as the media for treating water as disclosed herein. The particulate matter is believed to adsorb and oxidize the chemical contaminants from the water passing therethrough.

Thus, the particulate matter as described herein acts as an active substrate for absorption and oxidation of contaminating elements present in water. The particulate matter includes a combination of crystalline manganese oxide and amorphous manganese oxide, the crystalline form being present and forms passages throughout a cross section of said particulate matter that may be derived or scrapped off the black deposit as described herein or it can be artificially prepared in line (e.g. using a seed of black matter) or by any other techniques available in the art. In this connection, reference is made to Table 1 of Example 1A (which forms part of the invention), showing some components of the particulate matter including manganese (Mn), carbon (C), oxygen (O), aluminum (Al), iron (Fe), calcium (Ca) and organic matter. Upon heating of the matter to a temperature of 550° C., the manganese oxide and other non-organic substances remained intact, while the organic matter was combusted. The composition of the matter after said heating is shown in Table 2 of Example 1A (which forms part of the invention).

Generally, when referring to manganese it is to be understood to include this transition metal in any of its common oxidation states including +2, +3, +4, +6 and +7, though oxidation states from −3 to +7 were also observed. In some embodiments, the Mn is present as Mn(+2) (being thermodynamically favored in the absence of oxygen) or Mn(+3) and Mn(+4) (being favored in the presence of oxygen). As appreciated, oxidation of Mn(+2) may result in more than 30 known Mn(III), Mn(IV), or mixed Mn(III,IV) oxide/hydroxide minerals. The Mn(IV) oxides and the mixed Mn (III,IV) (hydroxy)oxides are termed manganates to emphasize their oxyanion properties.

The particulate matter comprises at least manganese oxide. In the context of the present disclosure, the term "manganese oxide" denotes any one of a variety of oxygen bound manganese compounds as well as hydroxides, including, without being limited thereto, Manganese(II) oxide (MnO); Manganese(II, III) oxide ($Mn_3O_4$); Manganese(III)

oxide ($Mn_2O_3$), Manganese dioxide, (manganese(IV) oxide, $MnO_2$); and Manganese(VII) oxide ($Mn_2O_7$).

The amount of manganese oxide in the particulate matter may vary and in some embodiments, the particulate matter comprises a total amount of manganese oxide between about 40% w/w to about 90% w/w, at times, between about 50% w/w to about 90% w/w, and further at times, between about 55% w/w to about 75% w/w, or any combination of ranges within 40% to 90%.

In some embodiments, the particulate matter has a blackish-brown color.

The particulate matter was characterized by a dual morphology. On the one hand, it comprises manganese oxide in crystalline form, and on the other hand, it comprises manganese oxide in an amorphous form. This is evident, for example, from the morphology studies provided with respect to the non-limiting Examples 1B and 1C. Specifically, XRD analysis showed that the particulate matter comprises a combination of crystalline material and amorphous material. This is evident from the existence of peaks (sharp peak) (indicative of crystal) and of large bump distributed (broad peak) in a wide range of 2 Theta (indicative of amorphous phase).

The crystalline and amorphous should take the meaning as known in the art. In this connection, while the term amorphous material is to be understood as relating to solid material without a repeating and defined shape or form, i.e. that that lacks a long-range order characteristic of a crystal, the term crystalline material should be understood as denoting a solid material whose constituent atoms are arranged in an ordered pattern extending in all three spatial dimensions.

In some embodiments, the crystalline manganese oxide within the particulate matter disclosed herein, is in a form of or composed of particles.

In some embodiments, the particles are microparticles. When in the form of microparticles, the particulate matter may be regarded as micro-scale powder to be used in accordance with the invention. In some other embodiments, the particulate matter may be of a larger scale.

At any rate, each particle is comprises of a plurality of nanosheets (two dimensional sheets in the nano scale). This may be evident from FIGS. 4 to 6 of the non-limiting Example 1C, where the crystalline manganese oxide is shown as a collection of micro-scale rounded shapes (particles), each having a structure composed of nanosheets.

In some embodiments, the nanosheets have an average thickness in any range between a lower thickness of from about 0.1, 0.5, 1, 2, 3, 4, 5, or even 10 nm to any upper thickness selected from 1 nm, 2, 3, 4, 5, 6, 7, 8, 9, 10, 20, 25, or even 100 nm.

As further shown in the Figures of Example 1C, the crystalline manganese oxide has a dandelion-like crystal structure.

In the context of the present disclosure, a dandelion like crystal structure (crystalline structure) is to be understood as a crystal structure composed of hundreds and even thousand of surfboard shaped "petal" manganese oxide containing sheets that bundle together with the petals originating from common cores to form the dandelion-like flower structure.

The existence of the "petal" sheets provides the particulate matter with a high specific surface area (SSA).

Without being bound by theory, it was suggested by the inventors that the dandelion like structure and its thus high SSA enables high mass loading/absorption of the soluble contaminates on the surface of the particulate matter, this includes both the "petal"/sheets surfaces and the outer surface (facing outwardly from the particulate matter) of the dandelion like structure.

The crystalline form of the manganese oxide is present throughout at least one cross section of the particles and/or the particulate matter. When referring to "at least one cross section" it is to be understood as denoting any cross section of the particle and thus teaching that the "petal" sheets are present along the depth of the particles. This provides the particle with the higher SSA as opposed to particles being only coated with manganese oxide.

In view of the above and in accordance with the present disclosure, absorption of contaminants takes place on the outer surface of the particles and in the internal nanosheet surfaces. In other words, when referring to the SSA it is to be understood as encompassing the individual nanosheet surfaces as well as the outer surfaces of the particles forming the particulate matter, all being accessible for absorption and oxidation of the chemical contaminants. As noted above, the SSA is much greater than the outer surface of the particles, at least, twice greater, trice greater or ×10, ×50, ×100, ×1,000 greater than said outer surface.

In some embodiments, the particulate matter comprises manganese mineral. Non-limiting examples of manganese minerals include birnessite, hausmannite, manganite, mananosite, psilomelane, romanechite and pyrolusite.

Figure 2:
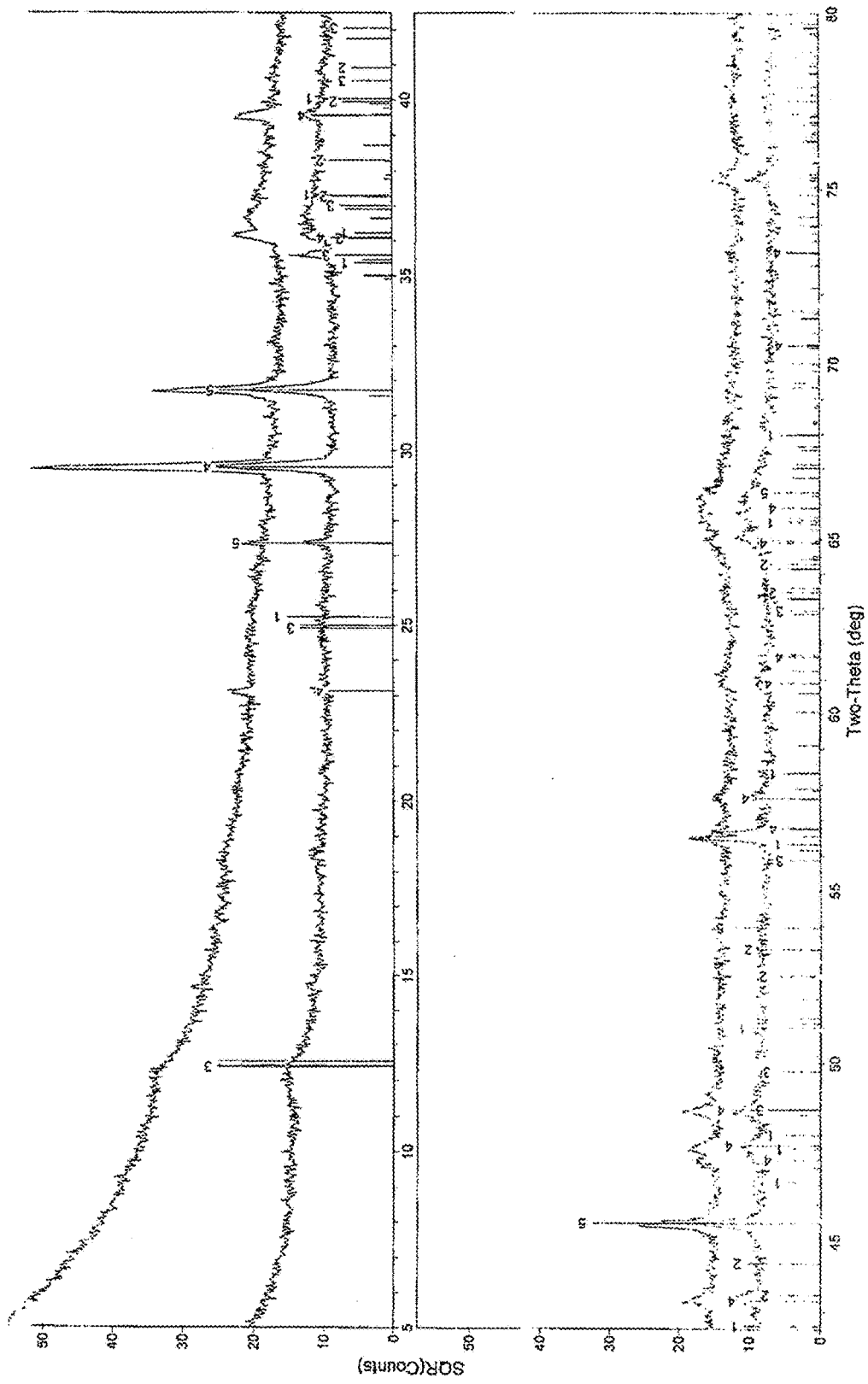
FIG. 2 is a graph showing XRD analysis of particulate matter with peaks indicating the existence of crystalline material within the particulate matter.

In one embodiment, the particulate matter comprises at least the crystalline mineral, birnessite, as also evident from the data provided in FIG. 2. Specifically, bimassite is known to have the chemical formula of $(Na_{0.3}Ca_{0.1}K_{0.1})(Mn^{4+}, Mn^{3+})_2O_4 \cdot 1.5H_2O$. In some other embodiments, the crystalline manganese oxide consists of birnassite.

In some other embodiments, the particulate matter comprises manganese oxide having predominantly an oxidation state of +III or +IV.

The amount of manganese oxide may vary and in some embodiments, the amount of the manganese oxide in crystal form out of the total amount (w/w) of the manganese oxide is at least 10% w/w, 20%, 30%, 40%, 50%, 60%, 70%, 80% or even 90% w/w, at times the amount of the manganese oxide in crystal form out of the total amount (w/w) of the manganese oxide is not more than 10% w/w, 20%, 30%, 40%, 50%, 60%, 70%, 80% or even 90% w/w, and at times, the amount of the manganese oxide in crystal form out of the total amount (w/w) of the manganese oxide is in a range between any combination of the above recited percentages.

In some embodiments, the particulate matter may be regarded as a bundle of particles. In accordance with some embodiments, these particles have an average dimension (e.g. diameter) of 1 μm to 5 mm, at times, an average dimension/diameter of between 50 μm to 1 mm. In some embodiments, the particles may have a larger dimension, e.g. 1 mm to 10 mm.

The particulate matter may comprise other metal oxides. In some embodiments, the particulate matter comprises at least one metal oxide in addition to manganese oxide. The additional metal oxide may be selected from the group consisting of aluminum oxide and iron oxide.

In some embodiments, the particulate matter comprises between about 0.2% w/w to about 1.5% w/w aluminum oxide, at times, between about 0.4% w/w to about 1% w/w aluminum oxide, further at times, between about 0.5% w/w to about 0.75% w/w aluminum oxide out of the total weight of the particulate matter.

In some embodiments, the particulate matter comprises between about 0.7% w/w to about 3.5% w/w iron oxide, at times, between about 1% w/w to about 2.5% w/w iron oxide, further at times, between about 1.5% w/w to about 2% w/w iron oxide out of the total weight of the particulate matter.

The particulate matter may also comprise organic material, including, without being limited thereto, calcium carbonate. The amount of calcium carbonate may vary and in some further embodiments, is within the range of about 1% w/w to about 30% w/w, at times, between about 10% w/w to about 30% w/w calcium carbonate, further at times, between about 15% w/w to about 25% w/w out of the total weight of the particulate matter.

The particulate matter may also comprise other substances, such as, sediments commonly found in soil aquifer treatment systems, mine water systems, underground water systems and in the bottom of deep lakes.

The particulate matter may be utilized for various applications. In accordance with one embodiment, the particulate matter is used for treatment of contaminated water, and in particular, for removing contaminants from streaming water. When referring to water it should be understood as encompassing water from any natural sweat water, such as but not limited thereto springs, lacks, ponds, rivers etc. or natural salt water, such as but not limited thereto seawater, or treated water, such as but not limited thereto purified water, desalinated water, or water in the process of desalination, etc., or wastewater or any artificial water source.

In accordance with the present disclosure, the water is treated by a sequence of steps.

As a first step in the process disclosed herein, the water to be treated is brought into contact with an oxygen source in the form of oxygen containing fluid. The oxygen is used as an oxidizing agent, to facilitate oxidation of the contaminants within the water.

In some embodiments, the oxygen source is gaseous oxygen (02), air containing oxygen or any other gaseous fluid containing high concentrations of oxygen.

In some other embodiments, the oxygen is dissolved oxygen or is a suitable source of oxygen, for example water having high concentrations (saturated) of oxygen.

In some embodiments, the oxygen containing fluid, either in the form of a gas or a liquid, is introduced into the flowing water to be treated by jets, injecting the oxygen source into the flowing water. This allows the high pressure introduction of the fluid containing the oxygen and thus high turbulence and mixing with the water. In some other embodiments, the oxygen is introduced by microjets forming bubbles (bubbling) that aerate the water, venturi tube, cascade aeration, oxidation tower, fine bubble aeration etc.

The mixing of the oxygen source with the water provides oxygen-rich water, i.e. water which is rich with dissolved oxygen (DO). The term "oxygen rich water" used herein denotes water comprising high levels of DO (close to or at maximal saturation). In some embodiments, the level of oxygen in the water may be defined by % saturation, being between about 30% to about 100%.

In some embodiments, contacting the oxygen source with the water to be treated is to an extent to provide an amount of oxygen in the water which would constitute about 30% v/v of its maximal saturation in fluid, at times, 40% or 50%, and even at times, up to 75% or 100% saturation. In some embodiments, the level of saturation of the oxygen fluid and the water being mixed is between 30%-90% of maximal saturation, at times, 40%-90% and further at times, 50%-90%.

The level of oxygen in the oxygen rich water may also be defined by its absolute concentration, being between 0.5 to 11.3 mg/l at 10° C., at times between 0.5 to 8.3 mg/l at 25° C.

The inventors have surprisingly found that the use of oxygen provides several advantageous compared to other oxidants, including for example free chlorine, chlorine dioxide, potassium permanganate and ozone. Without being bound by theory, as thermodynamically, oxidation of manganese by oxygen is slow, and oxygen is a small molecule, it is capable of diffusing into the passages of the particular matter and specifically into the intra structure of the particular matter, where only then the slow oxidation takes place. As noted above, this is possible due to the existence of sheets of crystalline manganese oxide also within the lumen of the particulate matter that provides the high SSA of the particles.

The oxygen rich water is then transferred for a subsequent treatment by the particulate matter downstream to the area of mixing with the oxygen. It is essential that the flow of the oxygen rich water through the particulate matter be slow to allow sufficient time for the absorption and/or oxidation of the contaminating substances on the plurality sheet surfaces of the particulate matter (and in the presence of the dissolved oxygen).

In some embodiments, the rate of flow of the water when in contact with the particulate matter is in the range of 0.005 cm/sec to 1 cm/sec, at times within the range of 0.01 cm/sec to 0.7 cm/sec.

Interestingly, the particulate matter may be regenerated during the water treatment process disclosed herein and as such there is a constant generation of the particulate matter. This is particularly true when the water treated contains soluble manganese. This new matter formation results in constant renewal and generation of active sites for oxidation of the contaminating chemical substances.

In addition, the regeneration of new matter eliminates the need to replace or replenish the particulate media and at most, accumulated new matter may need to be removed from time to time.

Once the water passes through the particulate matter, a significant amount of the contaminating substances are removed. The term "removing" in the context of the present disclosure is to be understood as referring to reduction or elimination of amount (concentration) of contaminants in the treated water compared to the initial amount of the same contaminant prior to being brought into contact with the particulate matter.

In some embodiments, removal of contaminants denotes a reduction of the initial concentration (initial amount) of at least one chemical contaminant to a predetermined threshold level.

In accordance with some embodiments, the predetermined threshold is a level determined for each individual suspected contaminant by and may be exhibited by a reduction of at least 10%, at times at least 20%, at least 30%, at times at least 40%, at least 50%, at times at least 60%, at least 70%, at times at least 80%, at times even at least 90%, at times even 100% as compared to its amount prior to treatment. At times, no detectable amount of the at least one contaminate is present in the water after undergoing the process disclosed herein.

A predetermined threshold may be a level considered by acceptable regulation authorities as an acceptable threshold to be considered as safe.

A no detectable amount should be understood as referring to an amount (level/concentration) that cannot be detected by acceptable devices, kits or other means.

For example, an acceptable threshold for some metals iron (Fe) 1.0 mg/L, Manganese (Mn) 0.2 mg/L, uranium 15 g/L, arsenic 10 g/L. Activity values can be also measured for radioactive substances. For example for uranium isotopes in Bq/L: $^{238}$U 3.0, $^{234}$U 2.8, $^{226}$R 0.5, $^{230}$Th 0.7, $^{210}$Pb 0.2, $^{210}$Po 0.1, $^{226}$Ra 0.5, $^{228}$Ra 0.2, $^{224}$Ra 2.1.

In other words, removal of any one of the above metals below the above threshold or below the above activity would be considered removal thereof from the treated water, in accordance with the present disclosure.

In accordance with some embodiments of the invention, the level of at least manganese oxide in the fluid, e.g. water, after being treated by the method of the present invention, is below 0.2 mg/L, at times, below 0.1 mg/L, and even below 0.01 mg/L. At times, the level of manganese oxide is reduced to a level that is not detected by conventional and acceptable protocols for detecting Mn in liquid.

As described herein and shown in the Examples, the present disclosure is not limited to a specific contaminant and can be used for removing from water at least one chemical contaminant (chemical substance). The chemical contaminant may be in any chemical form being dissolved in water.

In accordance with the some embodiments, the term "contaminant" may be used to denote a soluble form of one or more chemical elements that can undergo oxidation in the presence of an oxidizing agent such as an oxygen source. In some embodiments, the chemical element is an ionic form. In some other embodiments, the soluble form is a cation of a chemical element.

In some embodiments, the chemical element comprises metals or is characterized by having at least one characteristics of a metal. In some other embodiments, the chemical element comprises metalloids. In some other embodiments the chemical element comprises nonmetals and/or as inorganic substance.

When referring to a metal it is to be understood as including any one or more of the elements commonly known as the alkali metals, the alkaline earth metals, the transition metals, post transition metals and metalloids.

In accordance with some embodiments, the chemical element is an alkali metal being lithium (Li).

In accordance with some embodiments, the chemical element is an alkaline earth metal selected from the group consisting of radium (Ra), barium (Ba), beryllium (Be), strontium (Sr).

In accordance with some embodiments, the chemical element is a metal of transition metal. A preferred transition metal is any one or more selected from the group consisting of silver (Ag), cadmium (Cd), cobalt (Co), chromium (Cr), copper (Cu), Iron (Fe), molybdenum (Mo), Manganese (Mn), nickel (Ni), vanadium (V), mercury (Hg), zinc (Zn) and uranium (U).

In some other embodiments, the chemical element is a post transition element. A preferred post transition element is one or more selected from the group consisting of Thallium (Tl), lead (Pb), Tin (Sn) and Aluminum (Al).

In some other embodiments, the chemical element is a metalloid. A preferred metalloid is one or more selected from antimony (Sb) and arsenic (As). A preferred metalloid is arsenic.

The contaminant may also be a polyatomic nonmetal, such as, phosphorous (P) and selenium (Se).

In accordance with some embodiments, the chemical substance to be removed is capable of undergoing oxidation in the presence of dissolved oxygen in the flowing water. When referring to the chemical substance to be removed as "oxidizable chemical contaminants", it should be understood as capable of undergoing an oxidation reaction.

In some embodiments, the contaminant being removed is at least one of manganese, iron, radium, uranium, arsenic, silver, aluminum, barium, beryllium, cadmium, cobalt, chromium, copper, lithium, mercury, molybdenum, nickel, phosphorous, lead, antimony, selenium, tin, strontium, thallium, vanadium and zinc.

When referring to a contaminant it is to be understood as encompassing also any of their isotope. For example, when referring radium and uranium it should be understood as encompassing all possible isotopes.

In some other embodiments, the contaminant being removed is at least one of manganese, iron, radium, uranium, arsenic, silver, barium, cadmium, cobalt, chromium, copper, molybdenum, nickel, phosphorous, lead, tin, thallium, vanadium and zinc. In some embodiments, the contaminant being removed is at least one of manganese, iron, radium, uranium and arsenic. In some other embodiments, the contaminant being removed is at least one of manganese and arsenic.

Non-limiting examples of the ionic form of the contaminant include but not limited to $Fe^{+2}$, $Fe^{+3}$, $Mn^{+2}$, $As^{+3}$, $As^{+5}$, $V^{+2}$, $V^{+3}$, $V^{+4}$, $V^{+5}$, $Cr^{+3}$, $Cr^{+6}$, $Co^{+2}$, $Co^{+3}$, $Ni^{+2}$, $Ni^{+3}$, $Cu^{+2}$, $Zi^{+2}$.

Thus, the process is applicable for the removal of any one or any combination of 2, 3, 4, 5, 6, 7, 8, 9, 10 or more of the above recited contaminants. In some embodiments, the metal contaminant is at least manganese. In some other embodiments, the contaminant is at least arsenic.

As shown in Example 3, the particulate matter was found effective in reducing each one of the tested contaminants. Specifically and as shown in Table 6 and FIG. 7, the particulate matter was found effective in eliminating each one of silver, arsenic, barium, cadmium, cobalt, cupper, iron, molybdenum, lead, tin, thallium, vanadium and zinc.

As shown in Examples 2A and 2B, the particulate matter was found effective in reducing $Fe^{+2}$ concentration and eliminating both $Fe^{+3}$ and manganese concentrations.

Specifically, $Fe^{+2}$ concentrations reduced from 2 mg/ml to 0.2 mg/ml, whereas no detectable concentration of $Fe^{+3}$ and manganese were found thereafter.

Without being bound by theory, it was suggested that removal of the contaminants is not due to a biological process but rather due to the unique feature of the particulate matter which enables adsorbing and oxidizing of the contaminants and as such their removal from water.

The above understanding is based, inter alia, on the results presented herein where particulate matter heated to very high temperatures (550° C., at which organic matter and biological matter have decomposed) was still effective in removing iron to the same extent as the non-heated particulate matter (Example 2B).

In addition, as shown in Example 2C, the particulate matter was able to remove radiation emitting metals such as for example radium or uranium, as shown by the reduced alpha and beta radiations from the water before and after treatment.

Further, visual differences were observed in water before and after treatment with the particulate matter (data not shown).

Figure 3:
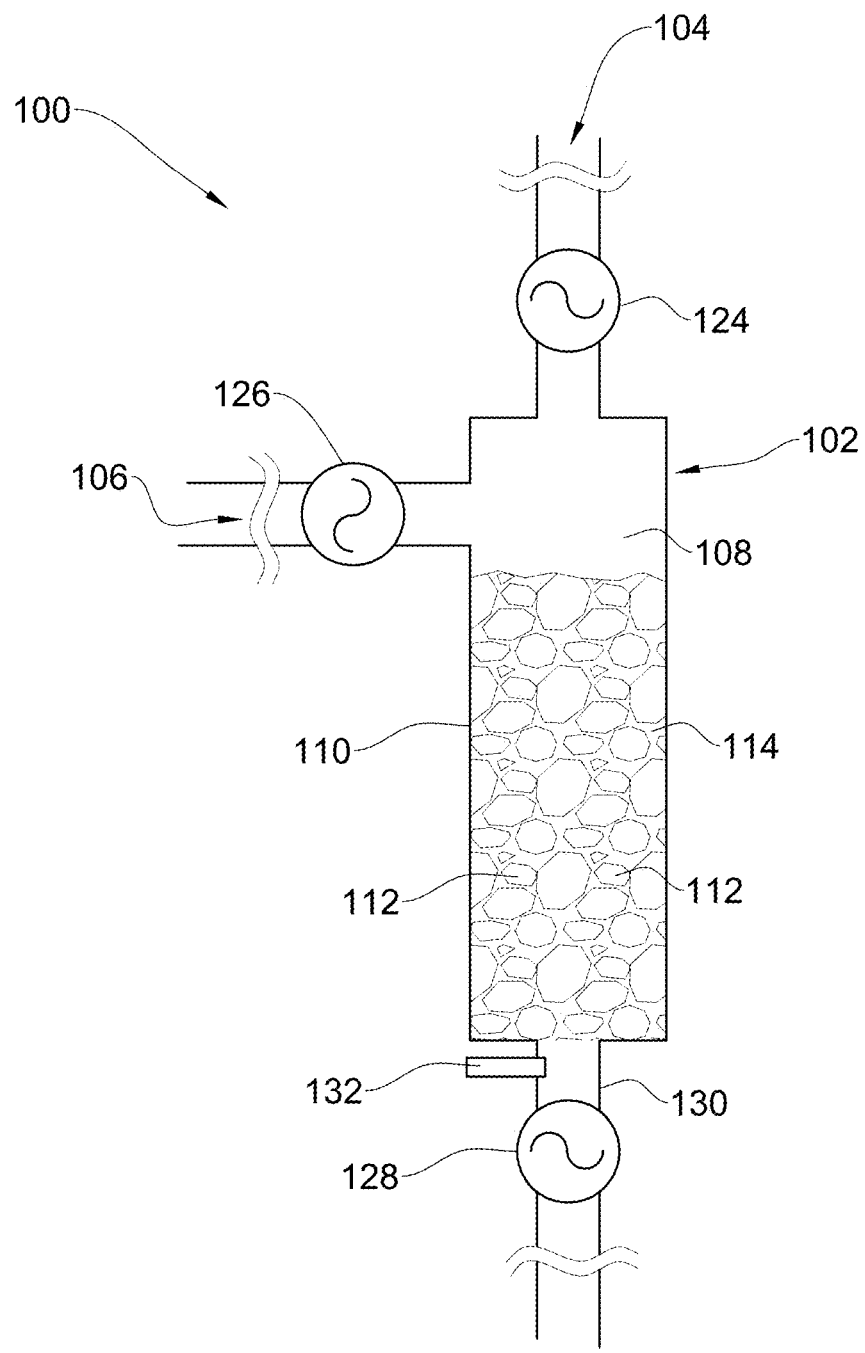
FIG. 3 is a schematic illustration of a device for performing the process of the present disclosure in accordance with an embodiment of the present disclosure.

Reference is now made to FIG. 3 providing a schematic illustration of a device for performing the process of the present disclosure. In this connection, it is noted that the process may be performed in other devices and vice versa.

FIG. 3 thus provides a device 100 comprising a mixing compartment 102 comprising a first inlet 104 through which flowing water is introduced into the mixing compartment 102 and a second inlet 106 through which oxygen containing fluid such as gaseous oxygen or air or water a priori mixed with oxygen is also introduced into the mixing compartment. The mixing compartment defines a mixing zone 108 in which the oxygen source dissolves in the flowing water to obtain the desired oxygen rich water.

In some embodiments, the oxygen source is continuously introduced into the mixing zone 108 while concomitantly water continuously flowing via the mixing zone and downstream to a treatment compartment 110.

Treatment compartment 110 being downstream to the mixing compartment 102 and in fluid communication therewith carries particulate matter 112 as defined herein, within a treatment zone 114. Thus, treatment compartment 110, receives the continuous flow of oxygen rich water from the mixing zone 108 and which in turn is transferred through the treatment zone 114 in a control manner to allow oxidation of the contaminating matter in the water. The flow of water through treatment zone 114 may be controlled by a control unit (not shown). Further control on the operation of the system may be achieved by respective valves and pumps 124, 126 and 128.

Further downstream, the treatment compartment contains at least one discharge outlet 130, for allowing the treated water to continuously flow out of the device. At times, and as also illustrated, a contamination level sensor 132 or array of sensors may be located at the outlet area or in proximity thereto (e.g. at the lower end of the treatment compartment and in proximity to the discharging outlet).

The device of FIG. 3 is illustrated as a column with two distinct compartments. However, it should be appreciated that other configurations may similarly be used. For instance, and in some embodiments, the mixing zone and the treatment zone may be housed within the same compartment, separated, for example, by an internal barrier. The device may have the form a sand filter, continuous stirred-tank (CSTR) reactors, moving bed reactor, Sequencing batch reactors (SBR) or sequential batch reactors. The mixing zone and the treatment zone may be the same or may be different in their shape, size or form.

The operation of the device may be controlled by a control unit, for controlling at least one of the following:
  flow of oxygen into the mixing compartment;
  level of oxygen in said flowing water;
  flow of oxygen rich flowing water through the treatment zone;

Further, the control unit may be equipped with a user interface for allowing an end use to manually control or interfere with the operation of the device, as well as to monitor the quality of water executing the device, e.g. by receiving data from the sensors and presenting the same on the monitor and/or on a printable report and/or by an audio alert.

The operation of the device may be by a remote control, e.g. using a wireless connection to the device or system containing it, or on site with the control unit wired to the device.

As used herein, the forms "a", "an" and "the" include singular as well as plural references unless the context clearly dictates otherwise. For example, the term "contaminant" includes one or more types of contaminants which may be present in water.

Further, as used herein, the term "comprising" is intended to mean that the particulate matter, for instance, includes the recited components, but not excluding other components. The term "consisting essentially of" is used to define particulate matter which include the recited components but exclude other components that may have an essential significance on treatment of water. "Consisting of" shall thus mean excluding more than trace amounts of other components. Embodiments defined by each of these transition terms are within the scope of this invention.

Further, all numerical values, e.g. when referring the amounts or ranges are approximations which are varied (+) or (−) by up to 20%, at times by up to 10% of from the stated values. It is to be understood, even if not always explicitly stated that all numerical designations are preceded by the term "about".

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described hereinbelow.

NON-LIMITING EXAMPLES

Example 1: Characterization of the Particulate Matter

Generally, the particulate matter was generated in pipes after mixing drilling water from the Soil Aquifer Treatment (SAT) system comprising manganese and oxygen concentrations higher than 2 mg/l.

FIG. 1 shows an example of a representative water pipe in which the particulate matter was identified in the interior (lumen) of the pipe as black brown dark aggregates (deposits).

For analysis and testing, the black deposit was obtained, washed and dried in an oven at 105° C. Samples from the particulate matter were used for analysis as described below.

Example 1A: Characterization of the Particulate Matter by Inductively Coupled Plasma Atomic Emission Spectroscopy (ICP-AES), and % NAS (Non Acid Soluble)

As shown in Table 1, the particulate matter was shown to predominantly composed of manganese oxide, organic material and calcium carbonate.

TABLE 1

| Components of the particulate matter. | |
|---|---|
| Component | % |
| % $Al_2O_3$ | 0.54 ± 0.30 |
| % $CaCO_3$ | 17.18 ± 8.13 |
| % $Fe_2O_3$ | 1.52 ± 0.76 |
| % Manganese oxide | 57.60 ± 15.80 |
| % acid non soluble dry base % NAS. This refers to any mater that doesn't burn in 550° C. but not metals. Mostly sand and silica. | 5.08 ± 7.18 |
| % organic material | 24.61 ± 10.19 |
| Sulfur in dry sulfuric content. | 0.003 ± 0.001 |

The particulate matter was heated at a temperature of 550° C. two hours and was then characterized using the method described above. Table 2 provides characterization of the particulate matter after being heated. As can be seen after being subjected to 550° C., the organic matter decomposed.

TABLE 2

The particulate matter after being heated at 550° C.

| Component | % |
|---|---|
| % Al$_2$O$_3$ | 0.72 ± 0.42 |
| % CaCO$_3$ | 23.11 ± 13.48 |
| % Fe$_2$O$_3$ | 2.02 ± 1.05 |
| % Manganse oxide | 74.03 ± 14.33 |
| % acid non soluble dry base % NAS | 6.65 ± 9.2 |
| Sulfur in dry matter SX | 0.004 ± 0.003 |

Example 1B: Characterization of the Particulate Matter by X Ray Diffraction (XRD)

Samples from the particulate matter were characterized using X-ray Diffraction (XRD). Prior to the experiment, the sample was fully dried at 105° C. for 24 hours and then heated to 550° C. for 2 hours.

As shown in FIG. 2, the particulate matter was found to be composed from elements in a crystalline form as well as in an amorphous form as evident from the existence of peaks (correspond to crystalline form) and from the large hump distributed viewed as broad peak (correspond to amorphous form). Further characterization of the crystals showed that they comprise manganese oxide. Comparison of the XRD peaks' pattern of the manganese oxide crystals to known manganese oxide crystal showed that the XRD peaks' patterns correspond to manganese oxide crystals in the particulate matter were mainly in the form of birnassite.

Example 1C: Characterization of the Particulate Matter by Electron Microscopy

The morphological features of the particulate matter were characterized using scanning electron microscopy (SEM), scanning transmission electron microscopy (STEM) and transmission electron microscopy (TEM).

Prior to the experiment, the samples were dried at 105° C. for 24 hours and/or then heated to 550° C. for 2 hours.

Figure 4A:
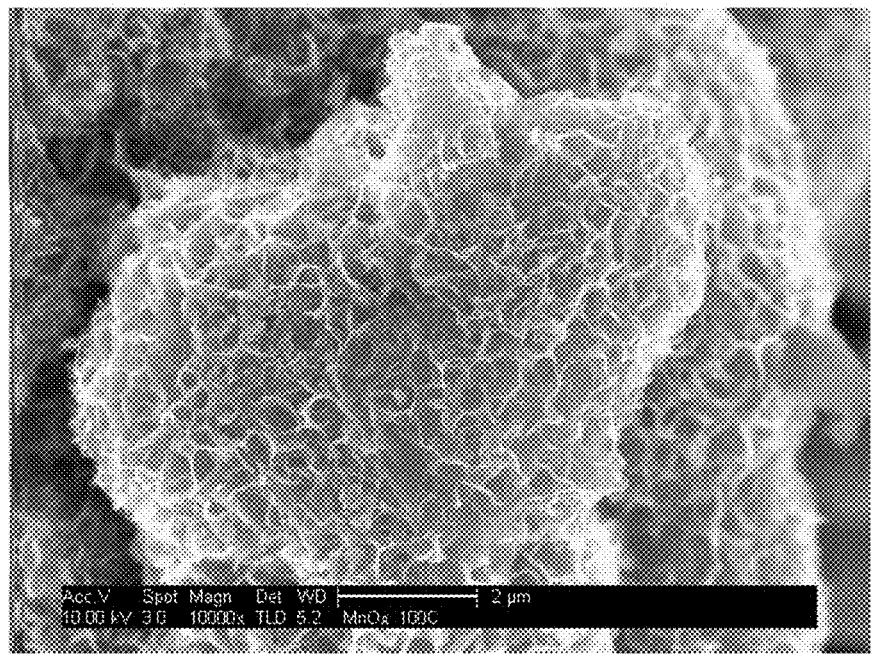
FIGS. 4A to 4D are representative scanning electron microscopy (SEM) images of particulate matter, with FIGS. 4B and 4D being enlarged images of FIGS. 4A and 4C, respectively, showing a dandelion like crystalline structure.
Figure 4B:
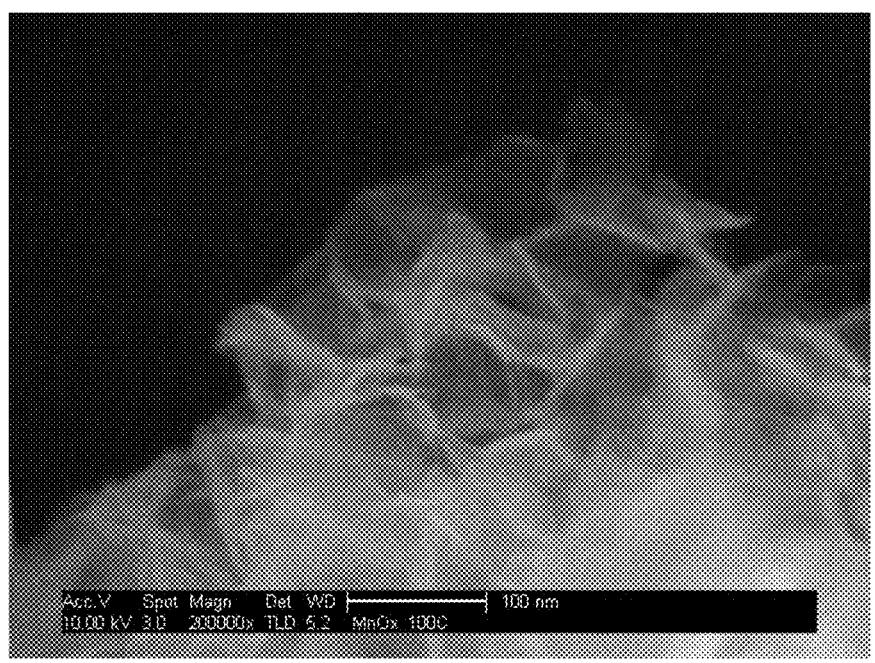
Figure 4C:
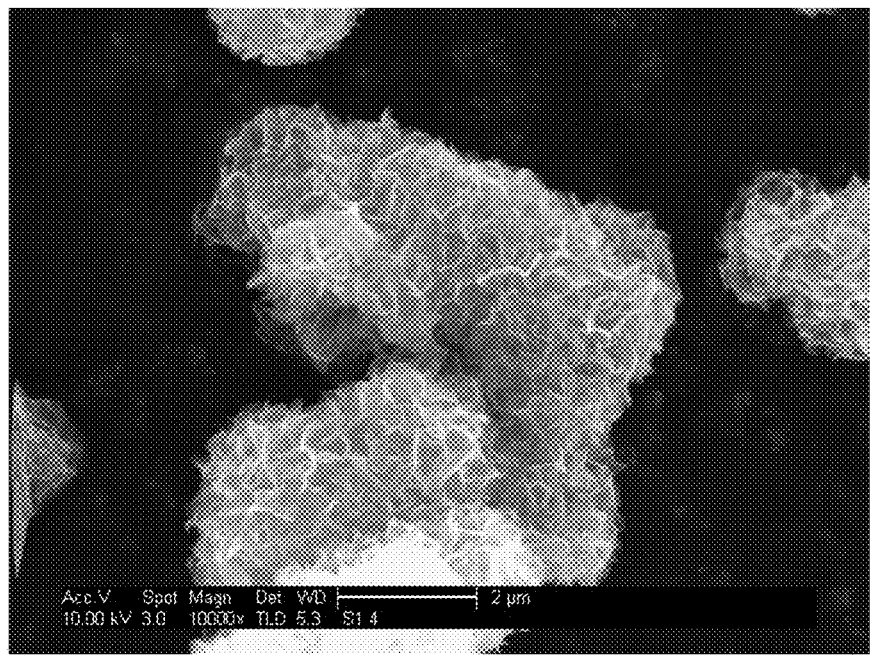
Figure 4D:
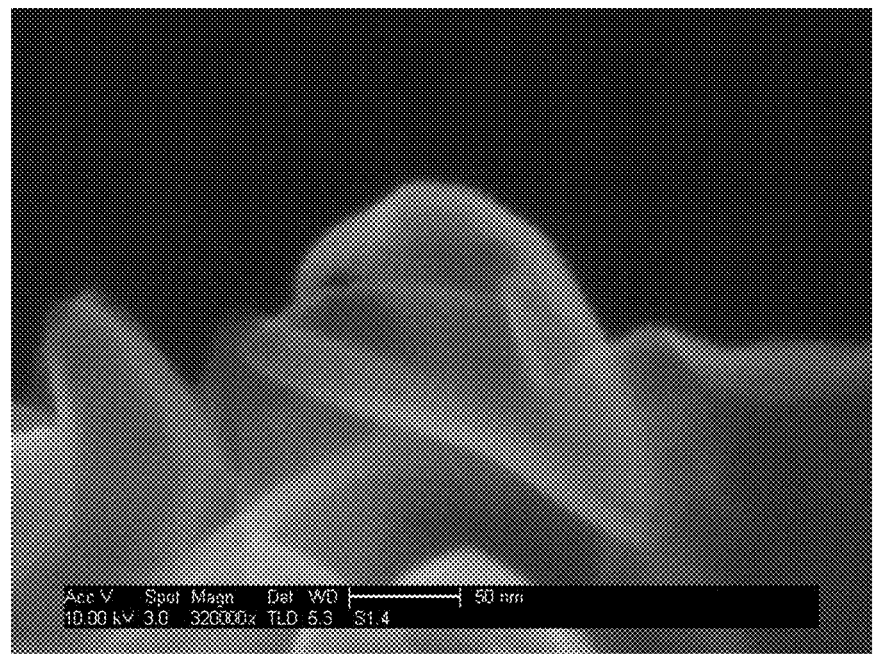

FIGS. 4A and 4C are SEM micrographs of the particulate matter with FIGS. 4B and 4D being enlargements of FIGS. 4A and 4C, respectively. As shown in FIGS. 4A to 4D, the morphology of the particulate matter is characterized by a sheet-like structure having a petal-like distribution with a dandelion-like morphology.

Figure 5A:
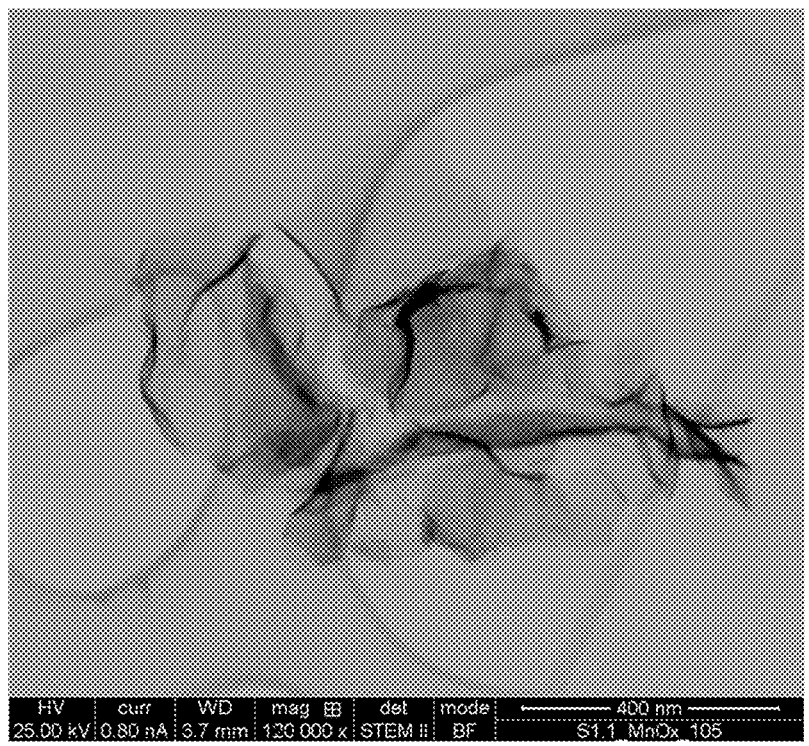
FIGS. 5A to 5D are representative scanning transmission electron microscopy (STEM) images of particulate matter showing crystalline sheets forming part of the dandelion like crystalline structure.
Figure 5B:
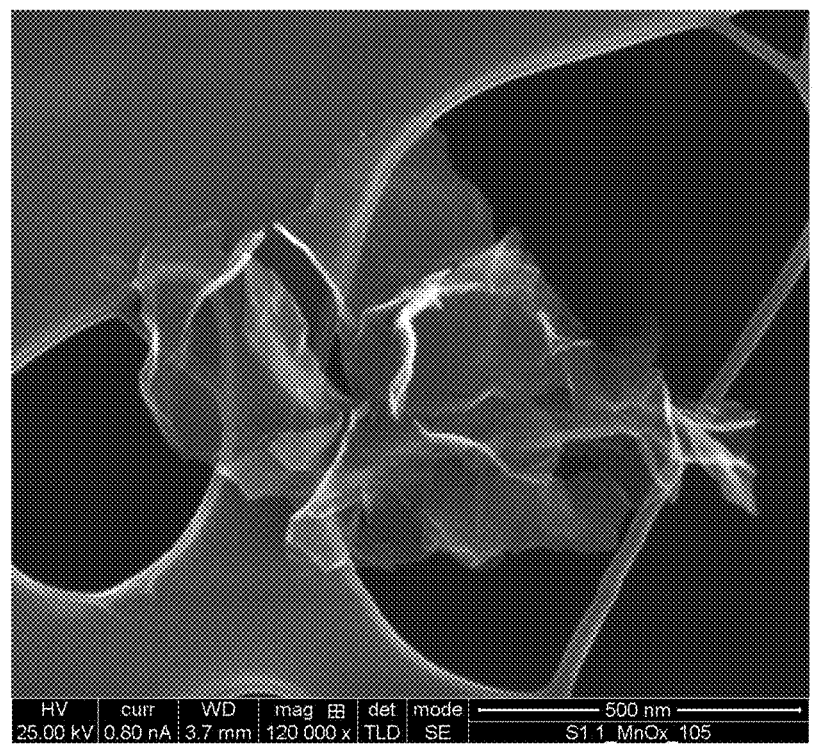
Figure 5C:
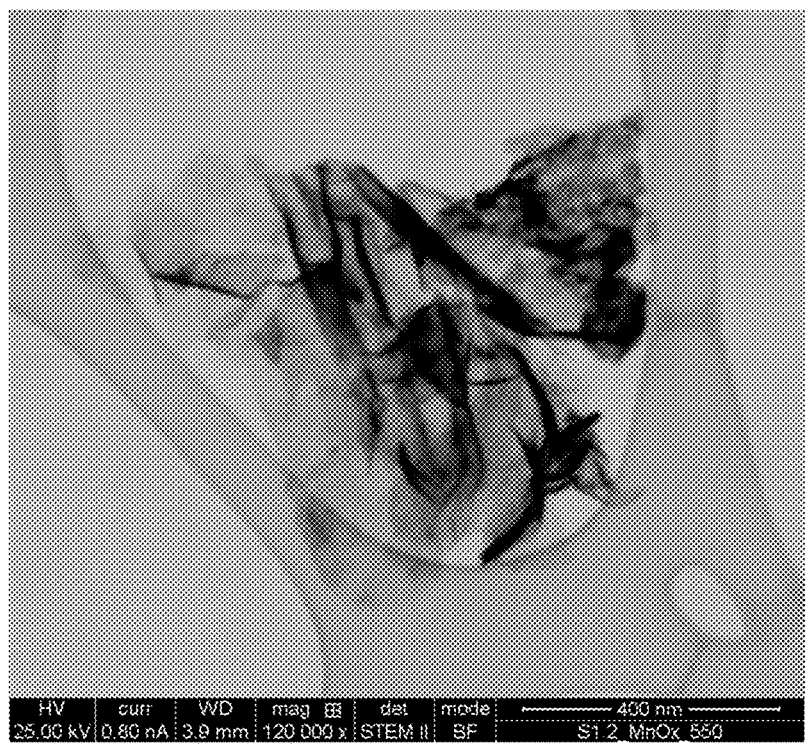
Figure 5D:
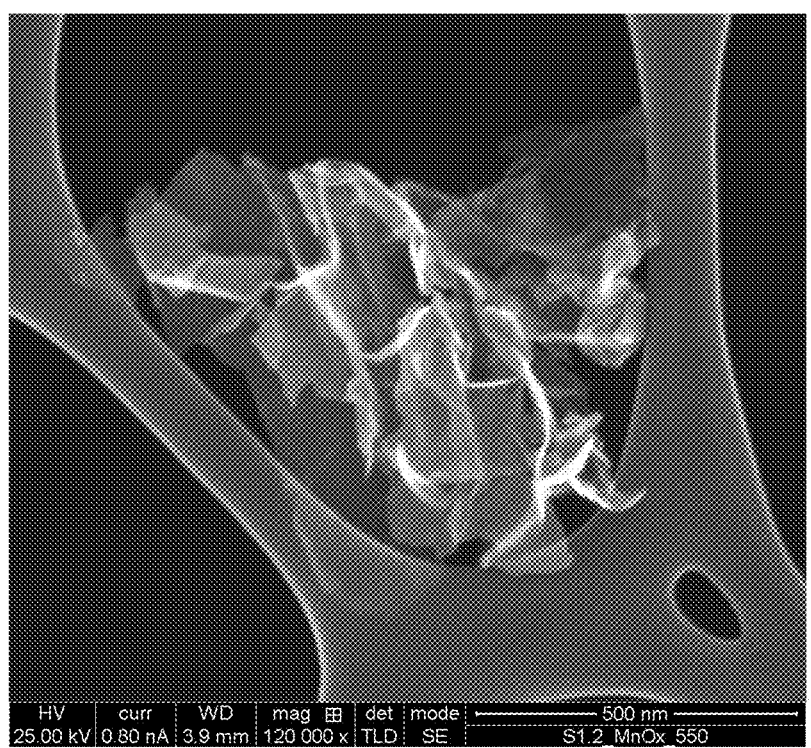

FIGS. 5A to 5D are STEM micrographs of the particulate matter dried at 105° C. (FIGS. 5A and 5B) and 550° C. (FIGS. 5C and 5D). The results from the STEM show that there were no difference in the morphology between the samples heated to 105° C. and 550° C. In addition, these images show the existence of sheet-like structure having a petal-like distribution.

Figure 6A:
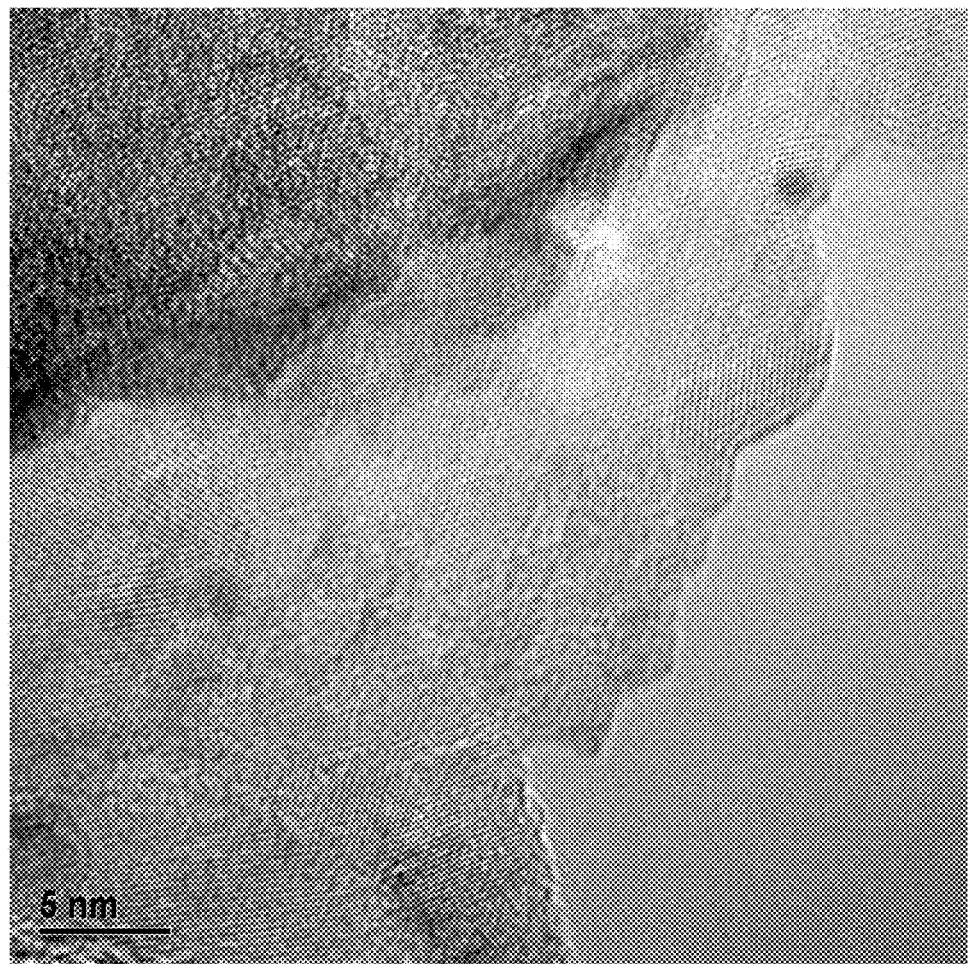
FIGS. 6A and 6B are representative transmission electron microscopy (TEM) images of particulate matter showing a net like nanoscale structure indicative of a crystalline structure.
Figure 6B:
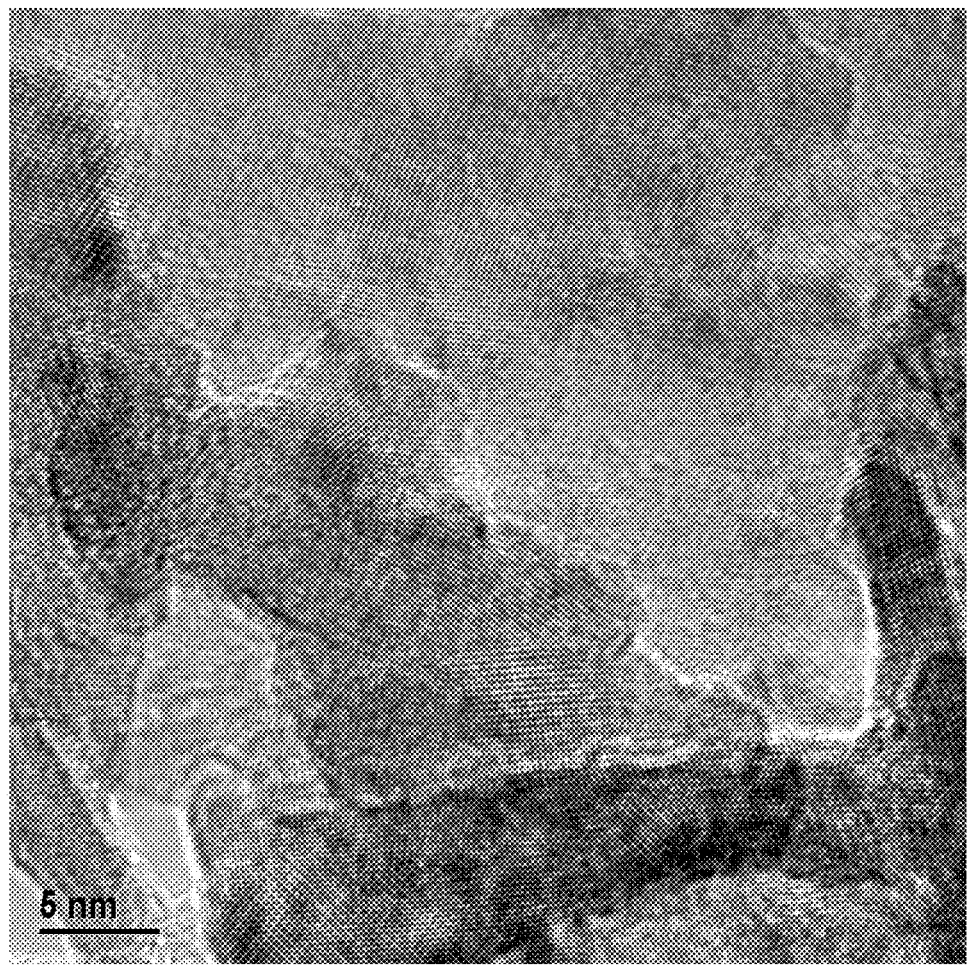

FIGS. 6A and 6B are TEM micrographs of the particulate matter dried at 105° C. (FIG. 6A) and 550° C. (FIG. 6B). The TEM images show that no differences were observed between the samples at the two tested temperatures In addition; these images show that the particulate matter is organized in an ordered crystalline structure having a fibrous-like net-like morphology. In addition, these images suggest a dendritic morphology which is similar to the dandelion pollen grains.

The microscopy data shown herein suggest that the manganese oxide crystals form an ordered structure having dandelion-like morphology.

Example 2: Testing the Activity of the Particulate Matter in Water Samples

The ability of the particulate matter to remove metals was examined as described below. When comparing water before and after treatment with the particulate matter, it has been found that before treatment the water was stagnant, whereas after treatment the water became clear. These results suggested that in the water treated by the particulate matter, the amount of contaminant was effectively reduced.

Example 2A: Removal of Manganese from Water

To test the ability of the particulate matter to remove manganese from water, water from Yavne drilling that contain 0.8-1 mg/l manganese were added to the particulate matter. After treating the water with the particulate matter, manganese was not detected in water as indicted by measuring the concentration with kit field NOVA 60 spectrophotometer.

Filed experiments show that the particulate matter has an oxidation ability and/or absorption of soluble manganese, soluble iron, radium and possibly uranium and Arsenic.

Example 2B: Removal of Iron from Water

The ability to remove iron from water was tested in a 50 ml sample comprising about 15 ml of the heated matter and water from a contaminated well at the ARAVA area.

The water was mixed with the particulate matter and filtered using a 0.45 micron filter. The content of iron was determined using a filed kit of NOVA 60 spectrophotometer.

TABLE 3

The iron content in untreated raw water comprising predominantly Fe$^{+2}$

| Condition | Fe$^{+2}$ concentration |
|---|---|
| before treatment | 2 mg/l |
| after treatment | 0.2 mg/l |

As can be seen from Table 3, treating untreated water with the composition of matter for about 10 second mixing resulted in about 90% removal of Fe$^{+2}$ from the water.

The ability of the composition of matter to remove iron from treated water was tested as well. As shown in Table 4, treatment of water resulted in complete removal of Fe$^{+3}$ from the water. The data in Table 4 correspond to water after aeration, in which the water coming out of the ground, are re-aerated by a fountain.

TABLE 4

The iron content in treated water comprising predominantly Fe$^{+3}$

| Condition | Fe$^{+3}$ concentration |
|---|---|
| before treatment | 1.3 mg/l |
| after treatment | 0 mg/l |

Taken together the results show the excellent ability of the particulate matter to remove iron (Fe$^{+2}$ and Fe$^{+3}$) from untreated and treated water. Interestingly it was also found that the heated particulate (namely comprising no organic material) was also capable of removing iron from treated and untreated water.

Thus, since the heated particulate matter successfully removed iron from water, it was suggested by the inventors that the ability to remove iron is not due to a biological process but rather due to the ability of the particulate matter to absorb iron and as such to remove it from water.

Example 2C: Removal of radiation emitting metals

The ability of the particulate matter to remove radiation emitting metals was tested in a 2 liter sample comprising about 100 gram of particulate matter and treated water (from Shizafon drilling). Alpha particles and beta particles are emitted mainly from radium and also uranium.

As shown in Table 5, no radiation was observed in the water after treating the water with the particulate matter. These results suggest the ability of the particulate matter to adsorb metals that emit radiation.

TABLE 5

| Removal of alpha and beta radiation | | |
|---|---|---|
| Parameter | Before treatment | After treatment |
| alpha radioactivity (B/l) | 1.55 | <0.050 |
| beta radioactivity corrected (B/l) | 1.291 | 0.033 |

Example 3: Removal of contaminations from samples

The ability of the particulate matter to remove different chemical elements was tested in different solution each comprising a different element/contaminant.

Arsenic solution in a concentration of 1 mg/l was prepared by dilution a stock solution of 1000 mg/l of As (Spex) in water. Solution of heavy metals (traces) was prepared by dilution of stock solutions for each metal element. The contaminants were usually prepared to a final concentration of 1 mg/l.

Each metal solution was divided into two beakers; each comprising a volume of 45 ml. An amount of 4.2 of the particulate matter was added to each beaker and the solution was mixed using a magnetic stirrer for 40 seconds and then left for about 10 minutes for separation. Samples were drawn using a syringe from the surface of each beaker. The samples were filtered through a GFC 0.45 μm in a sufficient amount.

Visual inspection of the samples after filtration showed that there was a very bright brown color which results probably from solubilized material.

The amounts of elements before and after treatment are shown in Table 6. The two experiments after treatment correspond to the results obtained from the two beakers. A value of "0" was assigned in case the concentration was below the detection level.

TABLE 6

| Removal of contaminations (all amount are provided in (μg/L)) | | | |
|---|---|---|---|
| Element | Before treatment | After treatment (1$^{st}$ experiment) | After treatment (2$^{st}$ experiment) | % removal |
| Silver (Ag) | 240 | 0 | 0 | 100 |
| Aluminum (Al) | 1097 | 449 | 534 | 55.2 |
| Arsenic (As) | 1056 | 8.5 | 4 | 99.4 |
| Barium (Ba) | 1064 | 7.9 | 7.4 | 99.3 |
| Beryllium (Be) | 1009 | 468 | 494 | 52.3 |
| Cadmium (Cd) | 1061 | 0.34 | 0.49 | 100 |
| Cobalt (Co) | 1054 | 0.71 | 1.42 | 99.9 |
| Chromium (Cr) | 1032 | 417 | 379 | 61.4 |

TABLE 6-continued

| Removal of contaminations (all amount are provided in (μg/L)) | | | |
|---|---|---|---|
| Element | Before treatment | After treatment (1$^{st}$ experiment) | After treatment (2$^{st}$ experiment) | % removal |
| Copper (Cu) | 966 | 39 | 41 | 95.9 |
| Iron (Fe) | 1033 | 0.65 | 0/33 | 100 |
| Lithium (Li) | 852 | 707 | 709 | 16.9 |
| Manganese (Mn) | 1028 | 67 | 67 | 93.5 |
| Molybdenum (Mo) | 1023 | 1.9 | 0.55 | 99.9 |
| Nickel (Ni) | 1032 | 23 | 27 | 97.6 |
| Phosphorus (P) | 5235 | 265 | 264 | 94.9 |
| Lead (Pb) | 1019 | 0.32 | 0 | 100 |
| Antimony (Sb) | 1060 | 538 | 596 | 46.5 |
| Selenium (Se) | 1103 | 538 | 596 | 46.5 |
| Tin (Sn) | 999 | 3.5 | 1.8 | 99.7 |
| Strontium (Sr) | 1073 | 910 | 944 | 13.6 |
| Thallium (Tl) | 1084 | 3 | 3 | 99.7 |
| Vanadium (V) | 1029 | 1 | 0.9 | 99.9 |
| Zinc (Zn) | 1075 | 13 | 4 | 99.2 |

Figure 7:
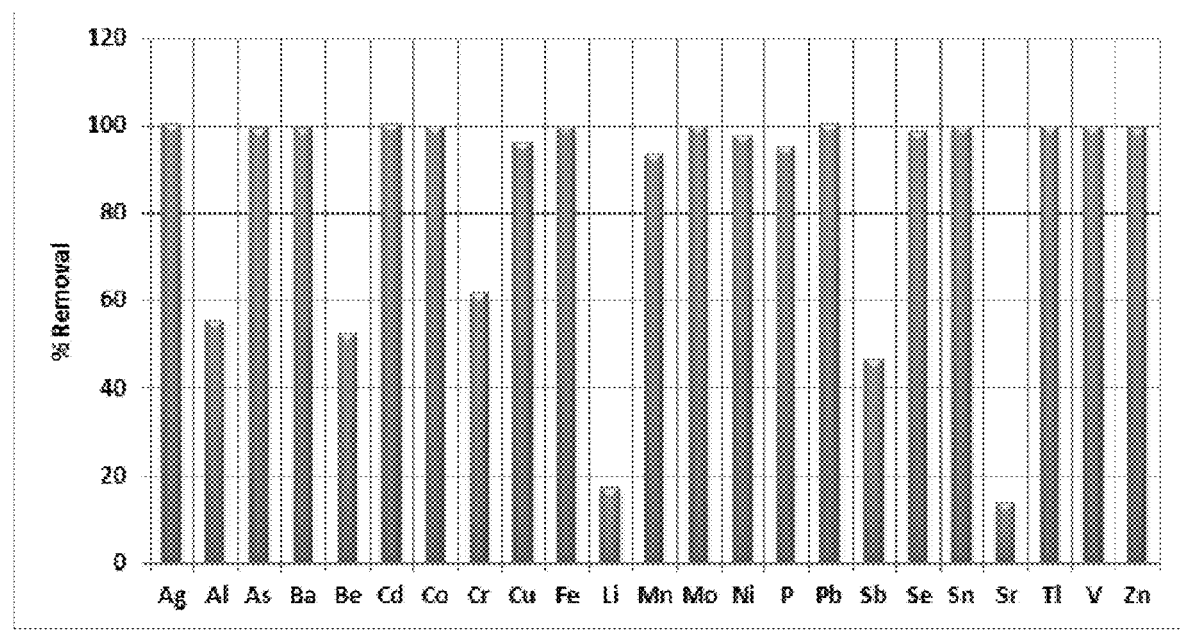
FIG. 7 is a bar graph showing % of the indicated chemical substances removed from respective solutions making use of the particulate matter according to the present disclosure.

FIG. 7 shows a graph representation of the data provided in Table 6.

As shown in Table 6 and FIG. 7, use of the particulate matter in a 1:10 ratio was efficient for all the treated contaminations.

What is claimed is:

1. A process for removing a chemical contaminant from an oxygen-rich water comprising:
    obtaining said oxygen-rich water comprising said chemical contaminant, wherein said oxygen-rich water is at an oxygen saturation level of between 30% to 100%;
    passing said oxygen-rich water through a particulate matter, comprising a combination of crystalline manganese oxide and amorphous manganese oxide, said crystalline form forms passages throughout a cross section of said particulate matter, wherein said crystalline form defines a specific surface area that is greater than the outer surface area of said particulate matter;
    thereby removing said chemical contaminant from said oxygen-rich water.

2. The process of claim 1, wherein said obtaining said oxygen-rich water comprises mixing oxygen with water under conditions that allow dissolution of the oxygen in said water.

3. The process of claim 2, wherein said oxygen is in a gaseous form.

4. The process of claim 1, wherein said passing comprises said passing at a flow rate of 0.005 cm/sec to 1 cm/sec.

5. The process of claim 1, wherein said passing comprises said passing at a flow rate of 0.01 cm/sec to 0.7 cm/sec.

6. The process of claim 1, wherein said chemical contaminants is a metal, a metalloid, or a combination thereof.

7. The process of claim 1, wherein said chemical contaminant includes manganese.

8. The process of claim 1, wherein said chemical contaminant comprises:
    iron, radium, uranium, arsenic, silver, aluminum, barium, beryllium, cadmium, cobalt, chromium, copper, lithium, mercury, molybdenum, nickel, phosphorous, lead, antimony, selenium, tin, strontium, thallium, vanadium, zinc, or any combination thereof.

9. The process of claim 1, further comprising heating said particulate matter prior to said passing.

10. The process of claim 9, wherein said heating said particulate matter is heating said particulate matter to a temperature of at least 550 degrees Celsius.

11. The process of claim 9, wherein said heating further comprises combusting organic matter in said particulate matter.

12. The process of claim 1, wherein said crystalline manganese oxide and said amorphous manganese oxide are at a concentration of between 40% w/w to 90% w/w of a total weight of said particulate matter.

* * * * *